United States Patent Office 3,306,821
Patented Feb. 28, 1967

3,306,821
PORFIROMYCIN DERIVATIVES AND METHOD OF MAKING SAME
William Schroeder, Scotts, Mich., assignor to The Upjohn Company, Kalamazoo, Mich., a corporation of Delaware
No Drawing. Filed Sept. 4, 1962, Ser. No. 221,310
28 Claims. (Cl. 167—65)

This invention relates to novel compositions of matter and to a process for the preparation thereof, and is particularly directed to the novel compound x-hydroxy-x-desamino-porfiromycin, its salts and derivatives, and to processes for producing the same.

Porfiromycin is a biosynthetic product produced by the controlled fermenation of an heretofore unknown species of actinomycete, Streptomyces ardus, NRRL 2817. Various methods for the production, recovery and purification of porfiromycin are described in the published literature, e.g., C. DeBoer et al., Antimicrobial Agents Annual, p. 17, 1960; R. R. Herr et al., Antimicrobial Agents Annual, p. 23, 1960. Porfiromycin is characterized by dark purple triclinic crystals which melt with decomposition at 201.5° C.; a molecular weight of about 344; a characteristic infrared absorption spectrum in mineral oil suspension at the following frequencies: 3370, 3250, 3150, 3000, 1720, 1690, 1640, 1600, 1555, 1535, 1440, 1403, 1390, 1365, 1342, 1320, 1245, 1215, 1160, 1135, 1098, 1065, 1045, 1028, 1008, 975, 952, 918, 890, 848, 808, 782, 758, 729, 718, 692, and 675 cm.$^{-1}$; slight solubility in water, moderate solubility in polar organic solvents, and essentially complete insolubility in hydrocarbon solvents.

It has now been found, according to this invention, that hydrolytic deamination of profiromycin yields x-hydroxy-x-desaminoporfiromycin. Under mild hydrolytic conditions an amino group is removed and replaced by an acidic hydroxyl group. This new compound has been given the trivial name desamidoporfiromycin. It is an acidic compound which hydrolyzes readily in an aqueous environment. Salts hydrolyze less readily and it is advantageous, therefore, to make a salt of this novel compound to increase its stability. Conveniently, an amine salt can be produced by reacting desamidoporfiromycin with, for example, a tri-loweralkylamine. Likewise, a desamidoporfiromycin alkali metal and alkaline earth metal salt can be produced by reacting desamidoporfiromycin with a base of the desired metal, for example, potassium, sodium, lithium, calcium, barium, and strontium.

Exemplificative of the above, porfiromycin is reacted with an alkaline material under mild hydrolytic conditions, suitably at a concentration less than one normal, for example, sodium hydroxide, at room temperature for 1 to 3 hours. Other alkaline materials can be used, for example, potassium hydroxide, lithium hydroxide, and the like, alkaline earth metal hydroxides, for example, calcium hydroxide, barium hydroxide, alkali metal carbonates, for example, sodium carbonate, potassium carbonate, and the like. Advantageously, the alkaline material can be in the form of a weakly basic anion exchange resin. [Suitable anion exchange resins for this purpose are obtained by chloromethylating by the procedures given on page 87 of Kunin, Iron Exchange Resins, 2nd ed. (1958), John Wiley and Sons, Inc., polystyrene cross-linked, if desired, with divinylbenzene prepared by the procedure given on page 84 of Kunin, supra, and treating with dimethylamine by the procedure given on page 97 of Kunin, supra. Anion exchange resins of this type are marketed under the trade names Dowex-3, Duolite A-30, and Permatit E.] After stirring the reaction mixture for a period of approximately 2 hours, the mixture is cooled, advantageously to a temperature of 4 to 6° C., and neutralized with a strong mineral acid, for example, hydrogen chloride, hydrogen iodide, sulfuric acid (preferred), phosphoric acid, and the like. The mixture is extracted rapidly with several portions of a cold halogenated hydrocarbon, for example, methylene chloride (preferred), and chloroform. The desamidoporfiromycin is then converted to a salt by treatment with a base, with or without first removing the solvent. When an amine salt is formed, it is sometimes of advantage to effect a solvent transfer to a solvent, for example, ether, dioxane, tetrahydrofuran or ethylene glycol dimethyl ether which is inert to the amine. When an inorganic base is used, it is of advantage to use a polar solvent, e.g., water, methanol, ethanol, acetone, or methyl ethyl ketone or a mixture thereof, especially an aqueous solution of a polar organic solvent. The more insoluble salts, advantageously, can be prepared by double decomposition.

When x-hydroxy-x-desaminoporifiromycin is treated with an ethereal solution of a diazoalkane, or diazoaralkane, an x-alkoxy- or x-aralkoxy-x-desaminoporfiromycin is obtained. Any diazoalkane or diazoaralkane having not more than 13 carbon atoms can be used, e.g., diazomethane, diazoethane, diazopropane, diazobutane, phenyldiazomethane, phenyldiazoethane, phenyldiazopropane, phenyldiazobutane, diphenyldiazomethane, and the like. Thus the alkoxy group can have from 1 to 13 carbon atoms, inclusive, and the aralkoxy group from 7 to 13 carbon atoms, inclusive. These compounds are represented by the formula:

$$RO(C_{16}H_{18}N_3O_5)$$

wherein R is alkoxy or aralkoxy as above defined and $(C_{16}H_{18}N_3O_5)$ is the x-desaminoporfiromycin radical. Thus when porfiromycin is represented by its molecular formula $NH_2—(C_{16}H_{18}N_3O_6)$, the group $(C_{16}H_{18}N_3O_5)$ is the desaminoporfiromycin radical. The x in x-desaminoporfiromycin signifies the position at which an amino group is replaced by an acidic hydroxyl group in the hydrolytic desamination of porfiromycin to form x-hydroxy-x-desaminoporfiromycin which has the molecular formula:

$$HO(C_{16}H_{18}N_3O_5)$$

On reacting an x-alkoxy or x-aralkoxy-x-desaminoporfiromycin with ammonia or an amine, the porfiromycin structure is regenerated. For example, treatment of x-methoxy-x-desaminoporfiromycin with ammonia yields porfiromycin itself. These reactions are useful in upgrading porfiromycin. Other amines yield substituted porfiromycins in which the substituent present is an N substituent; in effect, this procedure provides a method for selectively introducing substituents on one particular nitrogen of the four present in the porfiromycin molecule. A primary loweralkylamine such as methylamine gives N-methylporfiromycin, and a secondary loweralkylamine such as diethylamine gives, N,N-diethylporfiromycin. A dialkylaminoalkylamine such as γ-diethylaminopropylamine gives n-(γ-diethylamino)propylporfiromycin.

Thus by reacting x-alkoxy or x-aralkoxy-x-desaminoprofiromycin with a primary or secondary amine there are obtained N-substituted porfiromycins of the formula:

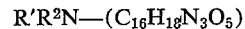
$$R'R^2N—(C_{16}H_{18}N_3O_5)$$

wherein $R'R^2N$ is derived from a primary or secondary amine, and the radical $(C_{16}H_{18}N_3O_5)$ is the x-desaminoprofiromycin radical. Any primary or secondary amine can thus be used to give porfiromycins having modified antibacterial properties. Typical N-substituted porfiromycins according to the invention are those in which R' is hydrogen or hydrocarbyl of from one to 13 carbon atoms and $R^2$ is hydrocarbyl of from one to 13 carbon atoms; R' and R² together with the nitrogen constitute a saturated heterocyclic amino radical —N͡Z of from 3 to 7 nuclear atoms, inclusive, wherein Z is a saturated divalent radical selected from the group consisting of alkylene, oxadialkylene, and thiadialkylene containing not more than 14 carbon atoms; R' is hydrogen and R² is an amino-alkyl radical R³R⁴N—$C_nH_{2m}$— wherein R³ and R⁴ taken separately are alkyl from 1 to 13 carbon atoms, inclusive, or taken together with the nitrogen constitute a saturated heterocyclic radical —N͡Z as above defined, and $n$ is an integer from 2 to 7. Suitable —N͡Z groups include ethylenimino, pyrrolidino, piperidino, morpholino, thiamorpholino, hexamethyleneimino, homomorpholino, 2-methylhexamethyleneimino, 2,2-dibutylhexamethyleneimino, 3,6-dimethylhexamethyleneimino, 2-ethylmorpholino, 2-ethyl-5-methylmorpholino, 3,3-dimethylmorpholino, 3-methylthiamorpholino, 2,3,5,6-tetramethylthiamorpholino, 2,3,6-trimethylthiamorpholino, 2-methylpiperidino, 3-methylpiperidino, 4-methylpiperidino, 2-butylpiperidino, 2-propylpiperidino, 4-isopropylpiperidino, 3,4-diethylpiperidino, 2-sec-butylpyrrolidino, 2,2-dimethylpyrrolidino, 2-ethylpyrrolidino, 2,4-dimethylpyrrolidino, 2-isopropylpyrrolidino, and hexahydro-3-isopropylpyrimidino. Examples of —$C_nH_{2m}$— are

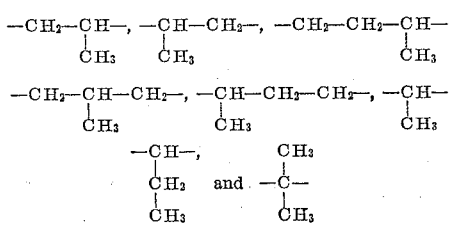

Suitable primary and secondary amines for this purpose include monoalkylamines, for example, methylamine, ethylamine, isopropylamine, sec-butylamine, amylamine, hexylamine, isohexylamine, octylamine, nonylamine, decylamine, undecylamine, dodecylamine, tridecylamine, and the like; dialkylamines, for example, dimethylamine, ethylmethylamine, methylpropylamine, methylisobutylamine, diisopropylamine, ethylhexylamine, methylisooctylamine, and the like; monoalkenylamines, for example, allylamine, 2-butenylamine, 3-hexenylamine, octenylamine, and the like; dialkenylamines, for example, diallylamine, di-2-butenylamine, di-3-hexenylamine, and the like; cycloalkylamines, for example cyclopropylamine, cyclobutylamine, cyclopentylamine, cyclohexylamine, and the like; N-alkylcycloalkylamines, for example, N-methylcyclopentylamine, N-ethylcyclopentylamine, N-propylcyclohexylamine, and like; cycloalkenylamines, for example, 2-cyclobuten-1-yl, 1-cyclobuten-1-ylmethyl, 2-cyclopenten-1-yl, 2-methyl-2-cyclopenten-1-yl, 2-methylenecyclohexyl, 5-methyl-2-cyclohexen-1-yl, 4-methyl-2-cyclohexen-1-yl, 2-methyl-2-cyclohexen-1-yl, 2-(2-cyclohexen-1-yl)ethyl, 2-cyclohexen-1-ylmethyl, 2,6-dimethyl-2-cyclohexen-1-yl, 2-ethyl-2-cyclohexen-1-yl, 2-cycloocten-1-yl, 2,6,6-trimethyl-2-cyclohexen-1-yl, 2-cyclononen-1-yl, 4-(2-cyclopenten-1-yl)butyl, 2-cyclodecen-1-yl, 2-cycloundecen-1-yl, and 2-cyclododecen-1-yl amines, and the like; aralkylamines, for example, benzylamine, phenethylamine, phenylpropylamine, benzhydrylamine, and the like; N-alkyl-N-aralkylamines, for example, N-methylbenzylamine, N-propylbenzylamine, N-isobutylbenzylamine, N-octylbenzylamine, N-methylphenethylamine, and the like; N-alkyl-arylamines, for example, N-methylaniline, N-isopropylaniline, N-hexylaniline, N-methyl-p-toluidine, N-ethyl-p-xylidine, N-methylnaphthylamine, and the like; N-aralkylarylamines, for example, N-benzylaniline, N-phenethylaniline, N-benzhydrylaniline, and the like; arylamines, for example, aniline, o-, m-, p-toluidine, p-xylidine, 1-naphthylamine, 2-naphthylamine, and the like. Cyclic secondary amines can also be used in the above reactions, for example, ethylenimine, pyrrolidine, piperidine, thiamorpholine, morpholine, hexamethyleneimine, homomorpholine, and lower-alkyl-substituted ethylenimines, pyrrolidines, piperidines, thiamorpholines, morpholines, and hexamethyleneimines, and the like.

The above amines can also be used for forming salts of x-hydroxy-x-desaminoporfiromycin as above described. Tertiary amines for example, pyridine, quinoline, isoquinoline, trialkylamines, such as trimethylamine, triethylamine, triisopropylamine, and the like, N,N-dialkylanilines such as dimethylaniline, diethylaniline, and the like, and N-alkylpiperidines such as N-ethylpiperidine, N-methylpiperidine, and the like, can also be used in forming these salts.

The term "alkyl" whenever appearing in the specification or claims refers to alkyl of one to 13 carbon atoms, inclusive, e.g., methyl, ethyl, propyl, butyl, amyl, hexyl, heptyl, octyl, nonyl, decyl, undecyl, dodecyl, and tridecyl, and the isomeric forms thereof. The term "alkoxy" whenever used in the specification or claims refers to alkoxy of one to 13 carbon atoms, inclusive, e.g., methoxy, ethoxy, propoxy, butoxy, amyloxy, hexyloxy, octyloxy, nonyloxy, decyloxy, undecyloxy, dodecyloxy, and tridecyloxy, and the isomeric forms thereof. The term "aralkoxy" whenever used in the specification or claims refers to aralkoxyhydrocarbon of from 7 to 13 carbon atoms inclusive, for example, benzyloxy, phenethoxy, benzhydryloxy, and the like. The term "aralkyl" whenever used in the specification or claims refers to aralkylhydrocarbon radicals, for example, benzyl, phenethyl, benzhydryl, and the like. The term "aryl" whenever used in the specification or claims refers to arylhydrocarbon radicals, for example, phenyl, tolyl, xylyl, naphthyl, biphenylyl, and the like.

The novel compounds of the invention, i.e., desamidoprofiromycin and its salts, x-alkoxy- and x-aralkoxy-x-desaminoporfiromycin and the N-substituted porfiromycins have antibacterial activity against a wide variety of microorganisms, for example, K. pneumoniae, P. vulgaris, S. paratyphi, S. pullorum, S. aureus, S. fecalis, E. coli, D. pneumoniae, and can be used to prevent or minimize liquefaction in packed yeast caused by Proteus vulgaris and to inhibit the growth of this organism in used cutting oils of which it is a contaminate. The novel compounds of the invention are also active against the organism Escherichia coli and can be used to inhibit the growth of this organism in paper mill systems where this organism has been recognized as an odor producer. These novel compounds are also active against the organism Streptococcus faecalis and can be used to prevent or minimize the growth of this organism on washed or stacked food utensils.

The following examples are illustrative of the process and products of the invention but are not to be construed as limiting. All percentages are by weight and all solvent mixture proportions are by volume unless otherwise noted.

*Example 1.—Desamidoporfiromycin and desamidoporfiromycin triethylamine salt*

A mixture of 500 mg. of powdered porfiromycin and 50 ml. of 0.1 N sodium hydroxide was stirred at room temperature for two hours. The solution was then cooled to 5° C., acidified with 6 ml. of 1 N sulphuric acid and extracted rapidly with several portions of cold methylene chloride. The resulting deep red extract was washed once with cold water and dried over magnesium sulfate in the cold for one hour. Upon removal of the solvent at 20° C. there remained a deep purple gum-like material which consisted of desamidoporfiromycin. This material was dissolved in 80 ml. of dry ether and then 1 ml. of triethylamine was added dropwise while the solution was stirred. Small crystals which separated were collected, washed with ether, and dried in the air; yield 350 mg. of desamidoporfiromycin triethylamine salt. This salt was then dissolved in chloroform. Ether and some triethylamine were then added to precipitate the product which loses birefringence at 180 to 185° C. and does not melt below 320° C.; has characteristic infrared absorption in mineral oil mull at the following wave lengths expressed in reciprocal centimeters:

| 3570 | 2600 | 1580 | 1485 | 1220 |
|------|------|------|------|------|
| 3320 | 2450 | 1567 | 1340 | 1102 |
| 3270 | 1715 | 1510 (sh) | 1327 | 1050 |
| 3170 | 1620 | 1500 (sh) | 1320 | 695; | has a characteristic ultraviolet absorption pattern as follows:

| UV max. in H₂O | a. |
|---|---|
| 219 mμ | 54.8 |
| 245 mμ (sh) | 21.7 |
| 360 mμ | 53.2 | and the following elemental analysis:

Calculated for $C_{16}H_{19}N_3O_6 \cdot (C_2H_5)_3N$: C, 58.6; H, 7.62; N, 12.4; O, 21.3. Found: C, 58.48; H, 7.59; N, 12.21; O, 21.12

The porfiromycin was made using the microorganism *Streptomyces ardus*, NRRL 2817, in accordance with the procedures given in DeBoer et al. and Herr et al., supra.

*Example 2.—x-Methoxy-x-desaminoporfiromycin*

A solution of 600 mg. of desamidoporfiromycin triethylamine salt, prepared as in Example 1, in 100 ml. of cold water was acidified to about pH 2 with 1 N sulfuric acid and extracted several times with cold methylene chloride. The extract was dried over magnesium sulfate; the solvent was removed at 20° C.; and the resulting residue was dissolved in 50 ml. of ether. After adding an ethereal solution of diazomethane, the mixture was allowed to stand overnight at room temperature. A small amount of insoluble material was removed by filtration. Upon evaporation of the ether, there remained a red gum-like material which was dissolved in methylene chloride. This solution was then washed quickly with aqueous triethylamine, dried over magnesium sulfate, and taken to dryness in vacuo at 20° C. Upon the addition and removal of some ether, there remained a deep red-blue semicrystalline residue of x-methoxy-x-desaminoporfiromycin; yield 330 mg. Rapid recrystallization from water gave deep carmine red crystals of x-methoxy-x-desaminoporfiromycin melting at 170–171° C.; having characteristic infrared absorption in mineral oil mull at the following wave lengths expressed in reciprocal centimeters: 3450, 3320, 3220, 1732, 1706, 1665, 1642, 1625, 1600, 1485, 1340, 1316, 1303, 1070, 1005, 815, 810, 760, 715, 695; having an ultraviolet max. in 5 percent ethanol of 320 mμ (a.=25.7); and having the following elemental analysis:

Calculated for $C_{17}H_{21}N_3O_6$: C, 56.19; H, 5.83; N, 11.57; O, 26.42. Found: C, 56.53; H, 6.07; N, 11.71; O, 25.83. On treating the above prepared compound with methanolic ammonia porfiromycin is regenerated.

If desired, desamidoporfiromycin can be used in place of the desamidoporfiromycin triethylamine salt.

*Example 3.—N-Methylporfiromycin*

A solution of 2.5 g. of crude x-methoxy-x-desaminoporfiromycin, prepared as in Example 2, in 50 ml. of methanol, was mixed with 20 ml. of a saturated solution of methylamine in methanol. After two hours, the resulting deep blue solution was evaporated to dryness at 25° C. Crystallization occurred upon the addition of 15 ml. of acetonitrile. The crystals of N-methylporfiromycin were collected, washed first with acetonitrile and then with ether; yield 1.5 g. of N-methylporfiromycin melting at 190 to 193° C. Recrystallization from acetonitrile gave 1 g. of N-methylporfiromycin melting at 193° to 195° C.; having characteristic infrared absorption in mineral oil mull at the following wave lengths expressed in reciprocal centimeters: 3470, 3340, 3190, 1715, 1693, 1635, 1610, 1570, 1555, 1515, 1348, 1326, 1312, 1065, 1050; having ultraviolet maxima in water at 226 and 374 mμ; and having the following elemental analysis:

Calculated for $C_{17}H_{22}N_4O_5$: C, 56.3; H, 6.1; N, 15.4; O, 22.1. Found: C, 56.87; H, 6.16; N, 15.58; O, 22.14.

*Example 4.—N,N-Dimethylporfiromycin*

A 2.5 g. portion of x-methoxy-x-desaminoporfiromycin, prepared as in Example 2, was treated with a methanolic solution of dimethylamine as described above in Example 3. The crystalline N,N-dimethylporfiromycin that separated from acetonitrile weighed 1.0 g.; had a characteristic infrared absorption in mineral oil mull at the following wave lengths expressed in reciprocal centimeters: 3460, 3290, 3190, 1725, 1700, 1650 (sh), 1632, 1615, 1550, 1505, 1485, 1340, 1325, 1310, 1085, 1060; had ultraviolet maxima in water at 233, 290, and 405 mμ; and had the following elemental analysis:

Calculated for $C_{18}H_{24}N_4O_5$: C, 57.5; H, 6.4; N, 14.9; O, 21.2. Found: C, 57.97; H, 6.20; N, 15.05; O, 21.35.

*Example 5.—N(γ-dimethylaminopropyl)porfiromycin*

A solution of 200 mg. of x-methoxy-x-desaminoporfiromycin, prepared as in Example 2, in 10 ml. of methanol was treated with 0.2 ml. of γ-dimethylaminopropylamine was allowed to stand at room temperature for two hours. Evaporation of the solvent at 25° C. left a dark blue gum-like material which was dissolved in methylene chloride. The solution was washed with several portions of water. The organic layer was separated, dried over magnesium sulfate and evaporated to dryness in vacuo at 20° C. The residue was dissolved in a small amount of ether and allowed to stand. Crystallization was slow, but after four days the crystals which formed were collected, washed with ether, and dried in vacuo at room temperature; yield 70 mg. of deep purple N-(γ-dimethylaminopropyl)porfiromycin crystals having a melting point range of 129 to 131° C.; a characteristic ultraviolet absorption pattern as follows:

| UV max. in H₂O: | a. |
|---|---|
| 224 | 54.8 |
| 374 | 55.8 | and the following elemental analysis:

Calculated for $C_{21}H_{31}N_5O_5$: C, 58.2; H, 7.2; N, 16.1; O, 18.4. Found: C, 58.47; H, 7.16; N, 16.32; O, 18.21.

This compound, as are all the N-substituted porfiromycins of this invention, is further characterized in that on hydrolytic deamination by the procedure of Example 1, there is obtained x-hydroxy-x-desaminoporfiromycin which can be converted to porfiromycin by the procedure of Example 2.

*Example 6*

By substituting the triethylamine in Example 1 by trimethylamine, tripropylamine, tributylamine, tripentylamine, trihexylamine, triheptylamine, and trioctylamine, or by dimethylamine, diethylamine, dipropylamine, dibutylamine, dipentylamine, diheptylamine, and dioctylamine, there are obtained the corresponding desamidoporfiromycin trimethylamine, tripropylamine, tributylamine, tripentylamine, trihexylamine, triheptylamine, trioctylamine, dimethylamine, diethylamine, dipropylamine, dibutylamine, dipentylamine, dihexylamine, diheptylamine, and dioctylamine salts.

*Example 7*

By substituting the diazomethane in Example 2 by diazoethane, diazopropane, diazobutane, diazopentane, diazohexane, diazoheptane, diazooctane, diazononane, diazodecane, diazoundecane, diazododecane and diazotridecane there are obtained x-ethoxy-, x-propoxy-, x-butoxy-, x-pentyloxy-, x-hexyloxy-, x-heptyloxy-, x-octyloxy-, x-nonyloxy-, x-decyloxy-, x-undecyloxy-, x-dodecyloxy-, and x-tridecyloxy-x-desaminoporfiromycin.

Example 8

By substituting the diazomethane in Example 2 by phenyldiazomethane and diphenyldiazomethane there are obtained x-benzyloxy and x-benzhydryloxy-x-desaminoporfiromycin.

Example 9

By substituting the x-methoxy-x-desaminoporfiromycin in Example 3 by the compounds of Examples 7 and 8 there is obtained N-methylporfiromycin.

Example 10

By substituting the methylamine in Example 3 by ethylamine, isopropylamine, sec-butylamine, amylamine, hexylamine, isohexylamine, heptylamine, octylamine, nonylamine, decylamine, undecylamine, dodecylamine and tridecylamine, there are obtained the corresponding N-ethylporfiromycin, N-isopropylporfiromycin, N-sec-butylporfiromycin, N-amylporfiromycin, N-hexylporfiromycin, N-isohexylporfiromycin, N-heptylporfiromycin, N-octylporfiromycin, N-nonylporfiromycin, N-decylporfiromycin, N-undecylporfiromycin, N-dodecylporfiromycin, and N-tridecylporfiromycin.

Example 11

By substituting the methylamine in Example 3 by dimethylamine, N-ethyl-N-methylamine, N-methyl-N-propylamine, N-methyl-N-isobutylamine, diisopropylamine, N-ethyl-N-hexylamine, and N-methyl-N-isooctylamine, the are obtained the corresponding N,N-dimethylporfiromycin, N-ethyl-N-methylporfiromycin, N-methyl-N-propylporfiromycin, N-methyl-N-isobutylporfiromycin, N,N-diisopropylporfiromycin, N-ethyl-N-hexylporfiromycin, and N-methyl-N-isooctylporfiromycin.

Example 12

By substituting the methylamine in Example 3 by allylamine, 2-butenylamine, 3-hexenylamine, and octenyl amine, there are obtained the corresponding N-allylporfiromycin, N-2-butenylporfiromycin, N-3-hexenylporfiromycin, and N-octenylporfiromycin.

Example 13

By substituting the methylamine in Example 3 by diallylamine, di-2-butenylamine, and di-3-hexenylamine, there are obtained the corresponding N,N-diallylporfiromycin, N,N-di-2-butenylporfiromycin, and N,N-di-3-hexenylporfiromycin.

Example 14

By substituting the methylamine in Example 3 by cyclopropylamine, cyclobutylamine, cyclopentylamine, and cyclohexylamine, there are obtained the corresponding N-cyclopropylporfiromycin, N-cyclobutylporfiromycin, N-cyclopentylporfiromycin, and N-cyclohexylporfiromycin.

Example 15

By substituting the methylamine in Example 3 by N-methylcyclopentylamine, N-ethylcyclopentylamine, and N-propylcyclohexylamine, there are obtained the corresponding N-methyl-N-cyclopentylporfiromycin, N-ethyl-N-cyclopentylporfiromycin, and N-propyl-N-cyclohexylporfiromycin.

Example 16

By substituting the methylamine in Example 3 by cyclopentenylamine and cyclohexenylamine, there are obtained the corresponding N-2-cyclopenten-1-ylporfiromycin and N-2-cyclohexen-1-ylporfiromycin.

Example 17

By substituting the methylamine in Example 3 by benzylamine, phenethylamine, (phenylpropyl)amine, and benzhydrylamine, there are obtained the corresponding N - benzylporfiromycin, N - phenethylporfiromycin, N-(phenylpropyl)porfiromycin, and N-benzhydrylporfiromycin.

Example 18

By substituting the methylamine in Example 3 by N-methylbenzylamine, N-propylbenzylamine, N-isobutylbenzylamine, N-octylbenzylamine, and N-methylphenethylamine, there are obtained the corresponding N-methyl-N - benzylporfiromycin, N-propyl-N-benzylporfiromycin, N-isobutyl-N-benzylporfiromycin, N-octyl-N-benzylporfiromycin and N-methyl-N-phenethylporfiromycin.

Example 19

By substituting the methylamine in Example 3 by N-methylaniline, N-isopropylaniline, N-hexylaniline, N-methyl-p-toluidine, N-ethyl-p-xylidine, N-methylnaphthylamine, there are obtained the corresponding N-methyl-N-phenyl-, N-isopropyl-N-phenyl-, N-hexyl-N-phenyl-, N-methyl-N-p-tolyl-, N-ethyl-N-p-xylyl-, and N-methyl-N-naphthylporfiromycins.

Example 20

By substituting the methylamine in Example 3 by aniline, o-, m-, p-toluidine, p-xylidine, 1-naphthylamine and 2-naphthylamine there are obtained the corresponding N-phenyl, N-o-, N-m-, N-p-tolyl-, N-p-xylyl-, N-1-naphthyl-, and N-2-naphthylporfiromycins.

Example 21

By substituting the methylamine in Example 3 by ethyleneimine, pyrrolidine, piperidine, hexamethyleneimine, morpholine and thiamorpholine there are obtained the corresponding x-N-ethyleneimino-, x-N-pyrrolidino-, x-N-piperidino-, x-N-hexamethyleneimino-, x-N-morpholino-, and x-N-thiamorpholino- x-desaminoporfiromycins.

I claim:
1. A composition of matter, x-methoxy-x-desaminoporfiromycin, which
   (a) is effective in inhibiting the growth of Gram-positive and Gram-negative bacteria and its essentially pure crystalline form;
   (b) is deep carmine red in color;
   (c) has characteristic infrared absorption in mineral oil mull at the following wave lengths expressed in reciprocal centimeters:

| | | | | |
|---|---|---|---|---|
| 3450 | 1706 | 1600 | 1303 | 810 |
| 3320 | 1665 | 1485 | 1070 | 760 |
| 3220 | 1642 | 1340 | 1005 | 715 |
| 1732 | 1625 | 1316 | 815 | 695; |

(d) has an ultraviolet maximum in 5 percent ethanol of 320 m$\mu$;
   (e) has the following elemental analysis: C, 56.53; H, 6.07; N, 11.71; O, 25.83;
   (f) has a melting point of 170–171° C.;
   (g) and has a molecular formula $CH_3O(C_{16}H_{18}N_3O_5)$.

2. A composition of matter, x-hydroxy-x-desaminoporfiromycin, having the molecular formula $$HO(C_{16}H_{18}N_3O_5)$$

(a) is effective in inhibiting the growth of Gram-positive and Gram-negative bacteria;
   (b) is an acidic compound;
   (c) hydrolyzes readily in an aqueous environment;
   (d) reacts with diazomethane to produce x-methoxy-x-desamino-porfiromycin, the compound defined in claim 1;
and which as its triethylamine salt
   (e) has characteristic infrared absorption in mineral oil mull at the following wave lengths expressed in reciprocal centimeters:

| | | | | |
|---|---|---|---|---|
| 3570 | 2600 | 1580 | 1485 | 1220 |
| 3320 | 2450 | 1567 | 1340 | 1102 |
| 3270 | 1715 | 1510(sh) | 1327 | 1050 |
| 3170 | 1620 | 1500(sh) | 1320 | 695; |

(f) has ultraviolet absorption maxima in water at 219 and 360 millimicrons; and (g) has the following elemental analysis: C, 58.48; H, 7.59; N, 12.21; O, 21.12.

3. A compound selected from the group consisting of alkaline earth, alkali metal and amine salts of x-hydroxy-x-desaminoporfiromycin as defined in claim 2, wherein a hydroxyl group is substituted for the amino group in the porfiromycin molecule.

4. The triloweralkyl amine salt of x-hydroxy-x-desaminoporfiromycin as defined in claim 2.

5. The triethylamine salt of x-hydroxy-x-desaminoporfiromycin as defined in claim 2.

6. A hydrocarbyl ether of x-hydroxy-x-desaminoporfiromycin as defined in claim 2 in which hydrocarbyl contains from 1 to 13 carbon atoms, inclusive, and is selected from the group consisting of alkyl and aralkyl and wherein the hydrocarbyl ether has replaced the hydrogen of the hydroxyl group.

7. A compound of the molecular formula $$R'R^2N\text{---}(C_{16}H_{18}N_3O_5)$$

wherein the substitution is at the position of the original amino group in the porfiromycin molecule in which $R'$ is selected from the group consisting of hydrogen and hydrocarbyl of from 1 to 13 carbon atoms inclusive, selected from the group consisting of alkyl, alkenyl, cycloalkyl, cycloalkenyl, aralkyl and aryl; $R^2$ is hydrocarbyl of from 1 to 13 carbon atoms, inclusive, selected from the group consisting of alkyl, alkenyl, cycloalkyl, cycloalkenyl, aralkyl and aryl; and $-(C_{16}H_{18}N_3O_5)$ is the radical obtained by the removal of the x-hydroxy group from the compound of claim 2.

8. A composition of matter, N-methylporfiromycin having the molecular formula $CH_3NH(C_{16}H_{18}N_3O_5)$, which (a) is effective in inhibiting the growth of Gram-positive and Gram-negative bacteria;

and in its essentially pure crystalline form (b) has characteristic infrared absorption in mineral oil mull at the following wave lengths expressed in reciprocal centimeters:

| 3470 | 1693 | 1555 | 1312 |
| 3340 | 1635 | 1515 | 1065 |
| 3190 | 1610 | 1348 | 1050 |
| 1715 | 1570 | 1326 | |

(c) has ultraviolet absorption maxima in water at 266 and 374 millimicrons;

(d) has the following elemental analysis: C, 56.87; H, 6.16; N, 15.58; O, 22.14; and (e) a melting point of 193–195° C.

9. A composition of matter, N,N-dimethylporfiromycin having the molecular formula $(CH_3)_2N(C_{16}H_{18}N_3O_5)$, which (a) is effective in inhibiting the growth of Gram-positive and Gram-negative bacteria;

and in its essentially pure crystalline form (b) has characteristic infrared absorption at the following wave lengths expressed in reciprocal centimeters:

| 3460 | 1725 | 1632 | 1505 | 1325 |
| 3290 | 1700 | 1615 | 1485 | 1310 |
| 3190 | 1650(sh) | 1550 | 1340 | 1085 |
| | | | | 1065; |

(c) has ultraviolet maxima at 233, 290 and 405 millimicrons, and (d) has the following elemental analysis: C, 57.97; H, 6.20; N, 15.05; O, 21.35.

10. A compound of the molecular formula $$R^3R^4N\text{---}C_nH_{2n}\text{---}NH\text{---}(C_{16}H_{18}N_3O_5)$$

wherein the substitution is at the position of the original amino group in the porfiromycin molecule wherein $n$ is an integer from 2 to 7 inclusive; $R^3$ and $R^4$ taken separately are alkyl from 1 to 13 carbon atoms, inclusive, and taken together with the nitrogen constitute a saturated heterocyclic radical  in which Z is a saturated divalent radical containing not more than 14 carbon atoms selected from the group consisting of alkylene, oxadialkylene and thiadialkylene; and $-(C_{16}H_{18}N_3O_5)$ is the radical obtained by the removal of the x-hydroxy group from the compound of claim 2.

11. A compound according to claim 10 in which $$R^3R^4N\text{---}C_nH_{2n}$$

is γ-dimethylaminopropyl, wherein the substitution is at the position of the original amino group in the porfiromycin molecule.

12. A compound of the formula $$R'R^2N\text{---}(C_{16}H_{18}N_3O_5)$$

in which $R'$ and $R^2$ when taken together with the nitrogen atom constitute a saturated heterocyclic radical having the formula  wherein Z is a saturated divalent radical of not more than 14 carbon atoms selected from the group consisting of alkylene, oxadialkylene and thiadialkylene; and $-(C_{16}H_{18}N_3O_5)$ is the x-desaminoporfiromycin radical, said compound being characterized in that on hydrolylic deamination with an alkaline material at a concentration less than 1 normal there is obtained the compound $HO\text{---}(C_{16}H_{18}N_3O_5)$, wherein the hydroxyl group is at the position of the original amino group in the porfiromycin molecule, as defined in claim 2.

13. A compound of the molecular formula $$R'R^2N\text{---}(C_{16}H_{18}N_3O_5)$$

wherein the substitution is at the position of the original amino group in the porfiromycin molecule wherein $R'$ and $R^2$ together with the nitrogen constitute a saturated heterocyclic amino radical 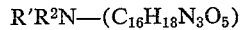 of from 3 to 7 nuclear atoms, inclusive, wherein Z is a saturated divalent radical selected from the group consisting of alkylene, oxadialkylene, and thiadialkylene containing not more than 14 carbon atoms.

14. A process which comprises (1) reacting porfiromycin with an alkaline material to a concentration less than 1 normal to produce x-hydroxy-x-desaminoporfiromycin, (2) reacting the x-hydroxy-x-desaminoporfiromycin formed with a compound selected from the group consisting of diazoalkanes and diazoaralkanes containing not more than 13 carbon atoms, and (3) reacting the thus-produced x-alkoxy x-desaminoporfiromycin and x-aralkoxy-x-desaminoporfiromycin with an amine selected from the group consisting of primary and secondary amines to produce an N-substituted porfiromycin having the molecular formula $R'R^2N\text{---}(C_{16}H_{18}N_3O_5)$ wherein $R'R^2N$ is derived from a primary and secondary amine, and $(C_{16}H_{18}N_3O_5)$ is the radical obtained by the removal of the x-hydroxy group from the compound of claim 2.

15. A process which comprises (1) reacting porfiromycin with an alkaline material at a concentration less than 1 normal to produce x-hydroxy-x-desaminoporfiromycin, and (2) treating the x-hydroxy-x-desaminoporfiromycin with a compound selected from the group consisting of diazoalkanes and diazoaralkanes containing not more than 13 carbon atoms to produce the corresponding x-alkoxy- and x-aralkoxy-x-desaminoporfiromycins wherein the substitution is at the position of the original amino group in the porfiromycin molecule.

16. A process which comprises (1) treating x-hydroxy-x-desaminoporfiromycin as defined in claim 2 with a compound of the group consisting of diazoalkanes and diazoaralkanes containing not more than 13 carbon atoms and (2) reacting the obtained x-alkoxy-x-desaminoporfiromycin and x-aralkoxy-x-desaminoporfiromycin with an amine selected from the group consisting of primary and secondary amines to produce an N-substituted porfiromycin having the molecular formula $R'R^2N\text{---}(C_{16}H_{18}N_3O_5)$ wherein R'R²N is derived from a primary and secondary amine, and (C₁₆H₁₈N₃O₅) is the radical obtained by the removal of the x-hydroxy group from the compound of claim 2.

17. A process which comprises (1) hydrolytically deaminating porfiromycin with sodium hydroxide at a concentration less than 1 normal to produce x-hydroxy-x-desaminoporfiromycin, (2) reacting the x-hydroxy-x-desaminoporfiromycin formed with diazomethane to produce x-methoxy-x-desaminoporfiromycin, and (3) reacting the x-methoxy-x-desaminoporfiromycin with methylamine to produce N-methylporfiromycin.

18. A process which comprises (1) hydrolytically deaminating porfiromycin with sodium hydroxide at a concentration less than 1 normal to produce x-hydroxy-x-desaminoporfiromycin and (2) treating the x-hydroxy-x-desaminoporfiromycin with diazomethane to produce x-methoxy-x-desaminoporfiromycin.

19. A process which comprises (1) treating x-hydroxy-x-desaminoporfiromycin as defined in claim 2 with diazomethane to produce x-methoxy-x-desaminoporfiromycin, and (2) reacting the x-methoxy-x-desaminoporfiromycin with methylamine to produce N-methylporfiromycin.

20. A process which comprises hydrolytically deaminating porfiromycin with an aqueous alkaline solution selected from the group consisting of alkali and alkaline earth metal hydroxides and carbonates, and anion exchange resins at a concentration of less than 1 normal to produce x-hydroxy-x-desaminoporfiromycin.

21. A process which comprises hydrolytically deaminating porfiromycin with sodium hydroxide at a concentration less than 1 normal to produce x-hydroxy-x-desaminoporfiromycin.

22. A process which comprises reacting x-hydroxy-x-desaminoporfiromycin as defined in claim 2 with a compound selected from the class consisting of diazoalkanes and diazoaralkanes containing not more than 13 carbon atoms.

23. A process which comprises reacting x-hydroxy-x-desaminoporfiromycin as defined in claim 2 with diazomethane to produce x-methoxy-x-desaminporfiromycin.

24. A process for producing N-substituted porfiromycin having the molecular formula

R'R²N—(C₁₆H₁₈N₃O₅)

wherein R'R²N is derived from a primary and secondary amine, and (C₁₆H₁₈N₃O₅) is the radical obtained by the removal of the x-hydroxy group from x-hydroxy-x-desaminoporfiromycin, which comprises reacting a compound as defined in claim 5 with an amine selected from the group consisting of primary and secondary amines.

25. A process which comprises reacting x-methoxy-x-desaminoporfiromycin with methylamine to produce N-methylporfiromycin.

26. A process which comprises reacting a compound of the formula HO—(C₁₆H₁₈N₃O₅) as defined in claim 2 with a compound of the formula R°=N₂ wherein R° contains not more than 13 carbon atoms and is selected from the class consisting of alkylidene and aralkylidene to form a compound of the formula RO—(C₁₆H₁₈N₃O₅) wherein R contains not more than 13 carbon atoms and is selected from the group consisting of alkyl and aralkyl and reacting the resulting compound with an amine of the formula R'R²NH wherein R' is selected from the group consisting of hydrogen and hydrocarbyl of not more than 13 carbon atoms selected from the group consisting of alkyl, alkenyl, cycloalkyl, cycloalkenyl, aralkyl and aryl, and R² is hydrocarbyl of not more than 13 carbon atoms selected from the group consisting of alkyl, alkenyl, cycloalkyl, cycloalkenyl, aralkyl and aryl, to form an N-substituted porfiromycin of the formula R'R²N—(C₁₆H₁₈N₃O₅) wherein R' and R² are as defined above and —(C₁₆H₁₈N₃O₅) is the same radical as in the starting compound HO—(C₁₆H₁₈N₃O₅).

27. A process which comprises reacting a compound of the formula HO—(C₁₆H₁₈N₃O₅) as defined in claim 2 with a compound of the formula R°=N₂ wherein R° contains not more than 13 carbon atoms and is selected from the class consisting of alkylidene and araylkylidene to form a compound of the formula RO—(C₁₆H₁₈N₃O₅) wherein R contains not more than 13 carbon atoms and is selected from the group consisting of alkyl and aralkyl and reacting the resulting compound with a saturated heterocyclic amine having from 3 to 7 nuclear atoms and the formula 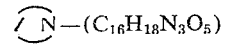 NH wherein Z is a saturated divalent radical of not more than 14 carbon atoms selected from the group consisting of alkylene, oxadialkylene, and thiadialkylene to form a porfiromycin of the formula

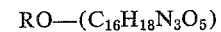—(C₁₆H₁₈N₃O₅)

wherein 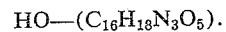— is as above defined and —(C₁₆H₁₈N₃O₅) is the same radical as in the starting compound

HO—(C₁₆H₁₈N₃O₅).

28. A process which comprises reacting a compound of the formula HO—(C₁₆H₁₈N₃O₅) as defined in claim 2 with a compound of the formula R°=N₂ wherein R° contains not more than 13 carbon atoms and is selected from the class consisting of alkylidene and aralkylidene to form a compound of the formula

RO—(C₁₆H₁₈N₃O₅)

wherein R contains not more than 13 carbon atoms and is selected from the group consisting of alkyl and aralkyl and reacting the resulting compound with an amine of the formula R³R⁴N—CₙH₂ₙ—NH₂ wherein n is an integer from 2 to 7, inclusive, R³ and R⁴ taken separately are alkyl of not more than 13 carbon atoms and taken together constitute a saturated heterocyclic radical containing from 3 to 7 nuclear atoms having the formula  wherein Z is a saturated divalent radical of not more than 14 carbon atoms selected from the group consisting of alkylene, oxadialkylene, and thiadialkylene to produce a porfiromycin of the formula

R³R⁴—N—CₙH₂ₙNH—(C₁₆H₁₈N₃O₅)

wherein n, R³ and R⁴ are as above defined and

—(C₁₆H₁₈N₃O₅)

is the same radical as in the starting compound

HO—(C₁₆H₁₈N₃O₅).

References Cited by the Examiner
UNITED STATES PATENTS 3,140,293 7/1964 Patrick _____ 260—319
3,148,117 9/1964 Schroeder _____ 167—65

OTHER REFERENCES

Antimicrobial Agents Annual—1960 page 17 et seq., page 23 et seq.

Jour. Amer. Chem. Soc., 84 pages 3184–3190, Aug. 20, 1962.

SAM ROSEN, *Primary Examiner.*

JULIAN S. LEVITT, *Examiner.*